Patented Feb. 13, 1934

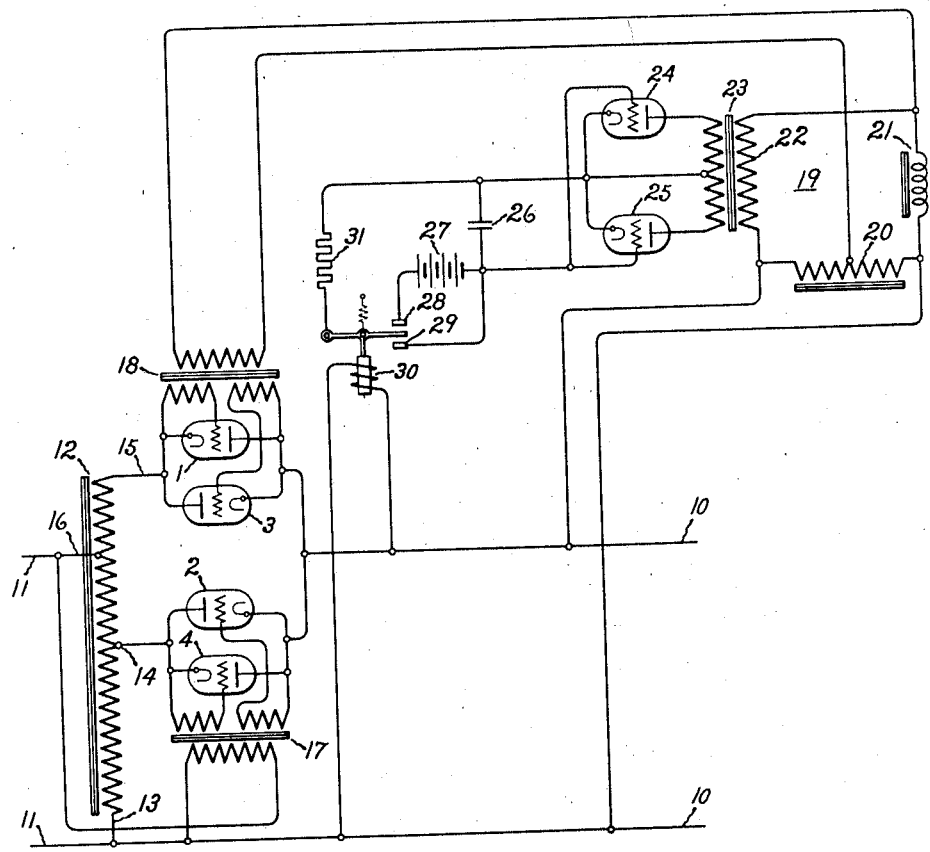

1,947,292

UNITED STATES PATENT OFFICE 1,947,292

ELECTRICAL REGULATING APPARATUS

George W. Garman, Scotia, N. Y., assignor to General Electric Company, a corporation of New York Application April 27, 1931, Serial No. 533,157
Renewed February 8, 1933

5 Claims. (Cl. 171—119)

My invention relates to electrical regulating apparatus and more particularly to such an apparatus including electric valves which is suitable for regulating the voltage or other electrical condition of a dynamo-electric machine or circuit.

Heretofore there have been devised numerous arrangements including electric valves for regulating the voltage or other electrical condition of a dynamo-electric machine or circuit. Certain of these arrangements of the prior art secure their regulating effect by varying the phase of an alternating potential used to excite the control grids of the several electric valves. The arrangements of the prior art, however, for securing an alternating potential variable in phase in response to variations in an electrical condition of a dynamo-electric machine or circuit, leave something to be desired in the way of sensitivity and rapidity of action.

It is an object of my invention to provide an improved electrical regulating apparatus which is of general application in regulating circuits utilizing electric valves and by means of which the phase of an alternating potential is automatically varied in response to variations in an electrical condition to be regulated.

In accordance with my invention I provide an impedance phase shifting circuit for controlling the electric valves by means of which the desired regulation is secured. One of the elements of the impedance phase shifting circuit comprises a transformer, the secondary winding of which is short circuited through a pair of electric valves, thus giving the transformer substantially a resistance characteristic. The grids of the electric valves are excited with the potential across a capacitor, the charging and discharging of which is controlled by any suitable electromagnetic relay responsive to the electrical condition to be controlled, such for example as a contact making voltmeter.

For a better understanding of my invention, together with other and further objects thereof, reference is had to the following description taken in connection with the accompanying drawing and its scope will be pointed out in the appended claims. The single figure of the accompanying drawing illustrates my invention as applied to an arrangement for maintaining constant the voltage of an alternating current feeder circuit.

Referring now to the drawing, there is illustrated an arrangement for maintaining constant the voltage of an alternating current feeder circuit 10 supplied from the alternating current supply circuit 11 through a regulating apparatus comprising an autotransformer 12, and electric valves 1 to 4 inclusive. The autotransformer 12 is provided with an end tap 13 common to the supply and feeder circuits, a low potential or bucking tap 14, a high potential or boosting tap 15 and an intermediate tap 16 for connection to the other side of the supply circuit. The feeder circuit 10 is connected to the boosting tap 15 through a pair of electric valves 1 and 3 reversely connected in parallel, and to the bucking tap 14 through a pair of electric valves 2 and 4, also reversely connected in parallel. Each of the valves 1 to 4 inclusive is provided with an anode, a cathode and a control grid and is preferably of the vapor electric discharge type. However, the above described regulating apparatus per se, together with an arrangement for controlling the several electric valves, forms no part of my present invention, but is disclosed and broadly claimed in a copending application of B. D. Bedford, filed April 27, 1931, Serial No. 533,177, and assigned to the same assignee as the present application. The grids of the valves 2 and 4 are energized from the secondary windings of a grid transformer 17, the primary winding of which is connected directly across the supply circuit 11. The connections are such that the grids of the valves 2 and 4 are excited with alternating potentials substantially in phase with their anode potentials. Similarly, the grids of electric valves 1 and 3 are energized from the secondary windings of a grid transformer 18. In order to regulate the voltage of the feeder circuit 10, there is provided an impedance phase shifting circuit 19 by means of which the alternating potential applied to the primary winding of the grid transformer 18 may be varied. The impedance phase shifting circuit 19 comprises an inductive winding 20 connected across the feeder circuit 10 and provided with an electrical midpoint and a reactor 21 and the primary winding 22 of a grid transformer 23 serially connected across the inductive winding. The secondary winding of grid transformer 23 is short circuited through a pair of electric valves 24 and 25 in order to give the winding 22 a resistance characteristic. Electric valves 24 and 25 are each provided with an anode, a cathode and a control grid and are preferably of the high vacuum, pure electron discharge type having a negative grid voltage characteristic; that is, valves in which the full range of conductivity may be obtained by applying a variable negative potential to their control grids. The primary winding of grid transformer 18 is connected between the electrical mid-point of the winding 20 and the junction between the winding 22 and reactor 21. The grids of the valves 24 and 25 are adapted to be excited with the potential across a capacitor 26. Capacitor 26 is provided with a charging circuit including a battery 27 the upper contact 28 of a contact making voltmeter 30, and a resistor 31, and with a discharging circuit comprising a lower contact 29 of the voltmeter 30 and resistor 31. The coil of the voltmeter 30 is connected across the alternating current feeder circuit 10 in order to respond to variations in the voltage of this circuit.

A detailed description of the operation of the regulating apparatus comprising the autotransformer 12 and the valves 1 to 4 inclusive, will be found in the above mentioned Bedford application. In brief, during the initial portion of each half cycle of alternating potential, current is transmitted from the supply circuit 11 to the feeder circuit 10 through the low potential tap 14 and its associated electric valves. At an intermediate point in each half cycle the load current is transferred from the valves associated with the tap 14 to the valves associated with the tap 15. That is, the regulating apparatus acts to buck the supply voltage during an initial portion of each half cycle and to boost the supply voltage during a later portion of each half cycle.

My invention is directed to an arrangement for accurately and rapidly varying the point in each half cycle at which the current is transferred from the low potential tap to the high potential tap in response to variations in the voltage of the feeder circuit 10, in order to maintain this voltage substantially constant. Assume, for example, that the voltage of the feeder circuit 10 falls below normal. The contact making voltmeter 30 will then close its contact 28 to charge the capacitor 26. The connections are such that the potential of the lower terminal of the capacitor 26, which is connected to the grids of the valves 24 and 25, increases negatively as it is charged from the battery 27, an increase in the negative grid potentials of valves 24 and 25 increases their resistance and the effective resistance of the winding 22. An increase in the resistance of the winding 22 advances the phase of the alternating potential supplied to the primary winding of grid transformer 18 to render the valves 1 and 3 conductive at earlier points in their respective half cycles of positive anode potential and thus raise the average voltage of the circuit 10 back to normal. In case the voltage of the circuit 10 tends to rise above normal, the voltmeter 30 will close its lower contact 29 to discharge the capacitor 26 through resistor 31 and to reverse the operation of the phase shifting circuit. Due to the fact that the valves 24 and 25 are operating with negative grid potentials the charge on the capacitor 26 may be maintained for a considerable length of time whenever the contact making voltmeter 30 is in its neutral position, so as to maintain constant the voltage of the circuit 10 at that particular value. While I have described my improved voltage control circuit as applied to a particular regulating apparatus, it will be obvious to those skilled in the art that it is equally applicable to any regulating apparatus in which the regulation is effected by controlling the phase relation of the grid potentials of a plurality of electric valves in response to variations in an electrical condition of the regulated circuit.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In a system of regulation including a regulated circuit and an electric valve provided with a control grid, means for exciting said control grid with a potential variable in phase in response to variations in an electrical condition of said regulated circuit comprising an impedance phase shifting circuit, means including an electric valve provided with a control grid for varying the impedance of an element of said phase shifting circuit, an energy storage element connected to determine the potential of said last mentioned control grid and means including an electromagnetic device responsive to an electrical condition of the regulated circuit for controlling the storing and dissipating of energy of said energy storage element.

2. In a system of regulation including a regulated circuit and an electric valve provided with a control grid, means for exciting said control grid with a potential variable in phase in response to variations in an electrical condition of said regulated circuit comprising an impedance phase shifting circuit including a transformer, an electric valve provided with a control grid and connected in circuit with said transformer so as to give it a series resistance characteristic, an energy storage element connected to determine the potential of said last mentioned control grid, and means including an electromagnetic relay responsive to an electrical condition of the regulated circuit for controlling the storing and dissipating of energy of said energy storage elements.

3. In a system of regulation including a regulated circuit and an electric valve provided with a control grid, means for exciting said control grid with a potential variable in phase in response to variations in an electrical condition of said regulated circuit comprising an impedance phase shifting circuit, means including an electric valve provided with a control grid for varying the impedance of an element of said phase shifting circuit, a capacitor, a circuit for exciting said last mentioned control grid with the potential across said capacitor, and means including an electromagnetic relay responsive to an electrical condition of the regulated circuit for controlling the charging and discharging of said capacitor.

4. In a system of regulation including a regulated circuit and an electric valve provided with a control grid, means for exciting said control grid with a potential variable in phase in response to variations in an electrical condition of said regulated circuit comprising an impedance phase shifting circuit including a transformer having primary and secondary windings, an electric valve provided with a control grid and connected to short circuit said secondary winding so as to give said transformer a series resistance characteristic, a grid circuit for said last mentioned valve including a capacitor, a charging circuit for said capacitor including a battery and a resistor, a discharging circuit for said capacitor including a resistor, and an electromagnetic relay responsive to an electrical condition of the regulated circuit for controlling the charging and discharging of said capacitor.

5. In combination, an alternating current supply circuit, a transformer winding provided with a plurality of electrically spaced terminals, a plurality of electric valves provided with control grids and associated with certain of said terminals, an alternating current load circuit connected to said supply circuit through said winding and valves, and means for transferring the load current from a valve associated with a terminal of lower potential to a valve associated with a terminal of higher potential at an intermediate point in each half-cycle of alternating potential to regulate the average voltage of the load circuit comprising means for exciting the grid of a valve associated with a terminal of lower potential with an alternating potential substantially in phase with its anode potential, an impedance phase shifting circuit, means including an electromagnetic relay responsive to an electrical condition of said load circuit for controlling the impedance of an element of said phase shifting circuit, and means for exciting the grid of a valve associated with a terminal of higher potential from said impedance phase shifting circuit.

GEORGE W. GARMAN.